United States Patent
Ishii et al.

(10) Patent No.: US 10,780,400 B2
(45) Date of Patent: Sep. 22, 2020

(54) AGENT, LIQUID, AND METHOD FOR CLEANING REVERSE OSMOSIS MEMBRANE

(71) Applicant: KURITA WATER INDUSTRIES LTD., Tokyo (JP)

(72) Inventors: Kazuki Ishii, Tokyo (JP); Takahiro Kawakatsu, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 148 days.

(21) Appl. No.: 15/743,922

(22) PCT Filed: Mar. 23, 2016

(86) PCT No.: PCT/JP2016/059149
§ 371 (c)(1),
(2) Date: Jan. 11, 2018

(87) PCT Pub. No.: WO2017/017994
PCT Pub. Date: Feb. 2, 2017

(65) Prior Publication Data
US 2018/0257038 A1    Sep. 13, 2018

(30) Foreign Application Priority Data
Jul. 27, 2015    (JP) .................... 2015-147779

(51) Int. Cl.
*B01D 65/02*    (2006.01)
*B01D 71/56*    (2006.01)
(Continued)

(52) U.S. Cl.
CPC ............ *B01D 65/02* (2013.01); *B01D 65/08* (2013.01); *B01D 71/56* (2013.01); *B08B 3/04* (2013.01);
(Continued)

(58) Field of Classification Search
CPC .... C11D 1/02; C11D 3/28; C11D 3/32; C11D 3/33; B08B 3/04; B08B 3/041; B08B 3/08
(Continued)

(56) References Cited

U.S. PATENT DOCUMENTS 4,357,254 A * 11/1982 Kapiloff ................. B01D 61/10
510/162
4,496,470 A * 1/1985 Kapiloff ................. B01D 61/10
134/42

(Continued)

FOREIGN PATENT DOCUMENTS

CN    102921305 A    2/2013
EP    0 561 464 A1    3/1993
(Continued)

OTHER PUBLICATIONS

Europe Patent Office, "Search Report for European Patent Publication No. 16830099.4," dated Feb. 13, 2019.
(Continued)

*Primary Examiner* — Gregory R Delcotto
(74) *Attorney, Agent, or Firm* — Manabu Kanesaka

(57) ABSTRACT

Provided is an agent and a liquid for cleaning an RO membrane to remove effectively foulants that can not be sufficiently removed with conventional cleaning agents when an RO membrane particularly an aromatic polyamide RO membrane has been used for water treatment and has become fouled resulting in degradation of performance such as permeation flux, pressure difference, and salt rejection rate. The agent for cleaning an RO membrane includes an aliphatic amide and/or an aromatic amide. Also provided is a method for cleaning an RO membrane with the cleaning agent or the cleaning liquid. The aliphatic amide and/or the aromatic amide particularly an aliphatic amide and/or an aromatic amide being soluble in water and having a rela-
(Continued)

tively low molecular weight remove effectively foulants adhered on an aromatic polyamide RO membrane.

14 Claims, 1 Drawing Sheet

(51) Int. Cl.

| | | |
|---|---|---|
| C11D 3/32 | (2006.01) | |
| C11D 7/32 | (2006.01) | |
| C11D 3/04 | (2006.01) | |
| B08B 3/08 | (2006.01) | |
| B08B 3/04 | (2006.01) | |
| C11D 3/28 | (2006.01) | |
| B01D 65/08 | (2006.01) | |
| C11D 1/02 | (2006.01) | |
| C11D 3/33 | (2006.01) | |
| C11D 11/00 | (2006.01) | |
| B01D 61/02 | (2006.01) | |

(52) U.S. Cl.
CPC .............. *B08B 3/041* (2013.01); *B08B 3/08* (2013.01); *C11D 1/02* (2013.01); *C11D 3/042* (2013.01); *C11D 3/28* (2013.01); *C11D 3/32* (2013.01); *C11D 3/33* (2013.01); *C11D 7/3263* (2013.01); *C11D 11/0011* (2013.01); *B01D 61/025* (2013.01); *B01D 2321/168* (2013.01); *Y02A 20/131* (2018.01)

(58) Field of Classification Search
USPC ....... 510/162, 238, 426, 427, 433, 477, 480, 510/488, 499, 500, 501; 134/34, 42
See application file for complete search history.

(56) References Cited

U.S. PATENT DOCUMENTS

| | | | |
|---|---|---|---|
| 5,294,644 A | 3/1994 | Login et al. | |
| 5,595,681 A | 1/1997 | Panandiker et al. | |
| 6,387,189 B1 | 5/2002 | Groeschl et al. | |
| 9,707,520 B2* | 7/2017 | Denvir .................. | A01N 37/36 |
| 2002/0045557 A1* | 4/2002 | Cable .................... | C11D 1/37 |
| | | | 510/180 |
| 2010/0261631 A1 | 10/2010 | Isobe et al. | |
| 2013/0324678 A1 | 12/2013 | Kawakatsu et al. | |
| 2015/0038389 A1* | 2/2015 | De Wit .................... | C11D 3/43 |
| | | | 510/179 |
| 2015/0038391 A1* | 2/2015 | De Wit ............... | C11D 11/0023 |
| | | | 510/238 |
| 2015/0147802 A1* | 5/2015 | Nishio .................... | C11D 1/86 |
| | | | 435/264 |
| 2015/0218490 A1* | 8/2015 | De Wit .................... | C11D 3/43 |
| | | | 510/179 |
| 2016/0115427 A1* | 4/2016 | Schmitt ................. | C11D 3/044 |
| | | | 134/6 |
| 2018/0169585 A1 | 6/2018 | Kawakatsu | |

FOREIGN PATENT DOCUMENTS

| | | |
|---|---|---|
| EP | 3299081 A1 | 3/2018 |
| JP | S55-051406 A | 4/1980 |
| JP | S58-008502 A | 1/1983 |
| JP | H01-503044 A | 10/1989 |
| JP | H06-100898 A | 4/1994 |
| JP | H09-057067 A | 3/1997 |
| JP | H09-506661 A | 6/1997 |
| JP | 2001-161811 A | 6/2001 |
| JP | 2001-507750 A | 6/2001 |
| JP | 2004-082021 A | 3/2004 |
| JP | 2004-244345 A | 9/2004 |
| JP | 2009-247992 A | 10/2009 |
| JP | 2013-223835 A | 10/2013 |
| JP | 2015-155534 A | 8/2015 |
| WO | 88/00184 A1 | 1/1988 |
| WO | 2004/076040 A1 | 9/2004 |
| WO | 2009/069296 A1 | 6/2009 |
| WO | WO-2013180136 A1 * | 12/2013 |

OTHER PUBLICATIONS

PCT/ISA/210, "International Search Report for International Application No. PCT/JP2016/059149," dated Jun. 7, 2016.
Japanese Patent Office, "Office Action for Japanese Patent Application No. 2015-147779," dated May 31, 2016.
"Measures Against Deterioration and Membrane Fouling", published by NTS, pp. 142 & 143; Sep. 5, 2008.
Europe Patent Office, "Communication for European Patent Publication No. 16830099.4," dated Oct. 16, 2019.

* cited by examiner

AGENT, LIQUID, AND METHOD FOR CLEANING REVERSE OSMOSIS MEMBRANE

TECHNICAL FIELD

The present invention relates to an agent and a liquid for cleaning a reverse osmosis (RO) membrane to recover performance thereof effectively, when an RO membrane particularly an aromatic polyamide RO membrane has been used in the field of water treatment and has become fouled resulting in degradation of performance such as permeation flux, pressure difference, and salt rejection rate. The present invention also relates to a method for cleaning an RO membrane with the cleaning agent or cleaning liquid.

BACKGROUND ART

Desalination of seawater and salt water with an RO membrane system and recovery of wastewater with an RO membrane system have been practiced in order to address the worldwide shortage of water supply. RO membranes included in RO membrane systems become fouled with various foulants, such as inorganic substances and organic substances. Since the fouling of an RO membrane results in the degradation of the properties of the RO membrane, such as salt rejection rate, pressure difference, and permeation flux, the development of a cleaning technique for effectively recovering the properties of a fouled RO membrane has been anticipated.

Aromatic polyamide RO membranes are becoming widely used as an RO membrane for water treatment, because aromatic polyamide RO membranes enable low-pressure operation and have a high desalination property. Since aromatic polyamide RO membranes have low resistance to chlorine, an aromatic polyamide RO membrane cannot be used in a treatment in which the RO membrane is brought into contact with chlorine under the operating conditions, unlike cellulose acetate RO membranes. Therefore, aromatic polyamide RO membranes are more likely to become fouled with microorganisms and organic substances than cellulose acetate RO membranes. On the other hand, aromatic polyamide RO membranes have higher resistance to alkali than cellulose acetate RO membranes and can be cleaned under alkaline conditions where the pH value is 10 or more.

Examples of known cleaning agents effective on membrane foulants, such as microorganisms and organic substances, which may be used for cleaning alkali-resistant aromatic polyamide RO membranes include the following (Non-patent Literature 1):

Alkaline agent (e.g., sodium hydroxide)
Surfactant (e.g., sodium lauryl sulfate)
Chelating agent (e.g., EDTA)

In some cases, it is not possible to sufficiently clean a heavily fouled RO membrane with the above chemicals.

For example, in the case where an RO membrane is used for treating raw water containing large amounts of inorganic substances and organic substances in a wastewater recovery system or a seawater desalination facility, foulants containing inorganic substances and organic substances adhere to the RO membrane. Such deposits may fail to be sufficiently removed with the above detergents. In particular, when feed containing polyalkylene glycol, nonionic surfactants, saccharides, or protein, which has a high molecular weight, is treated with an RO membrane, the TOC components of the substances adhere to the membrane and gradually degrade the performance of the membrane. It is considerably difficult to recover the performance of such an RO membrane with the above detergents known in the related art.

While sodium hypochlorite is a chemical highly effective on microorganisms and organic substances, sodium hypochlorite has not been used for cleaning aromatic polyamide RO membranes because aromatic polyamide RO membranes have low resistance to chlorine. In a known technique that can be used when a chlorine microbiocide is used, free chlorine is reduced with a reductant before the chlorine microbiocide is fed to an RO membrane (Patent Literature 1).

There have been several studies in which organic solvents, such as ethanol and ethylene glycol monomethyl ether, are used as a component of an agent for cleaning an RO membrane. For example, in the cleaning method described in Patent Literature 2, a hydrophilic organic solvent, such as ethanol or methanol, is used in combination with a surfactant; this method is not practical because ethanol and methanol have a high flash point.

The cleaning agent described in Patent Literature 3 includes an alkyl ether of ethylene glycol. Since alkyl ethers of ethylene glycol include a hydrophilic group and a hydrophobic group and have a structure similar to that of a monovalent alcohol, they are highly toxic. Alkyl ethers of ethylene glycol are listed by PRTR (pollutant release and transfer register) Law because of the irritating odor. Since the work environment score is set to 5 mg/L or less, it is not possible to use an alkyl ether of ethylene glycol at a high concentration.

It is described in Patent Literature 4 that, when a polyol is used as a component of a cleaning agent, a monovalent alcohol, an ether, a ketone, and an amide can be used as an organic solvent in combination with the polyol. In Patent Literature 4, only a formamide is mentioned as a specific example, and there is no description of specific cleaning effects achieved by using the agent in combination or alone. Furthermore, in Patent Literature 4, they are described only as a solvent for the polyol; there is no description of the use of the polyol under alkaline conditions.

The microbiocide for water treatment described in Patent Literature 5 includes an acid, a corrosion inhibitor, and a compound including an amide group and/or a urea group, such as N,N-dimethylacetamide. The microbiocide for water treatment described in Patent Literature 6 includes an acid, a corrosion inhibitor, and an organic acid including an amino group in the molecule, such as asparagine. The agents described in Patent Literatures 5 and 6 are microbiocides and not designed to be used for cleaning membranes. The amide and the organic acid are used as a stabilizer for the acid and the corrosion inhibitor, and there is no description of the cleaning effect of these components.

Patent Literature 1: JP H9-57067 A
Patent Literature 2: JP S58-8502 A
Patent Literature 3: JP S55-51406 A
Patent Literature 4: WO2004/076040 A
Patent Literature 5: JP 2004-244345 A
Patent Literature 6: JP 2004-82021 A
Non-patent Literature 1: "Measures against Deterioration and Membrane Fouling" (published by NTS), p. 142, 2008

SUMMARY OF INVENTION

An object of the present invention is to provide an agent and a liquid for cleaning an RO membrane to remove effectively foulants that can not be sufficiently removed with conventional cleaning agents when an RO membrane particularly an aromatic polyamide RO membrane has been used for water treatment and has become fouled resulting in degradation of performance such as permeation flux, pressure difference, and salt rejection rate. A further object of the present invention is to provide a method for cleaning an RO membrane with the cleaning agent or the cleaning liquid.

The inventors of the present invention sampled and prepared various fouled RO membranes and conducted extensive studies of a cleaning component effective on the fouled RO membranes. As a result, it was found that an aliphatic amide and/or an aromatic amide and, in particular, an aliphatic amide and/or an aromatic amide that is soluble in water and has a relatively low molecular weight enable highly effective removal of foulants adhered on an aromatic polyamide RO membrane.

The summary of the present invention is as follows.

[1] An agent for cleaning a reverse osmosis membrane, the agent comprising an aliphatic amide and/or an aromatic amide.

[2] The agent for cleaning a reverse osmosis membrane according to [1], wherein the aliphatic amide and/or the aromatic amide is soluble in water.

[3] The agent for cleaning a reverse osmosis membrane according to [1] or [2], wherein the aliphatic amide and/or the aromatic amide has a molecular weight of 300 or less.

[4] The agent for cleaning a reverse osmosis membrane according to any one of [1] to [3], wherein the aliphatic amide and/or the aromatic amide is a compound represented by Formula (I) below,

[Chem. 1]

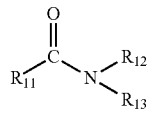

Formula (I)

wherein, in Formula (I), $R_{11}$ represents a hydrogen atom, an alkyl group having 1 to 3 carbon atoms, an N-containing heterocyclic group, or an aromatic group, where the alkyl group, the N-containing heterocyclic group, and the aromatic group may include a substituent; $R_{12}$ represents a hydrogen atom or an alkyl group having 1 to 3 carbon atoms, where the alkyl group may include a substituent; and $R_{13}$ represents a hydrogen atom or an alkyl group having 1 to 3 carbon atoms.

[5] The agent for cleaning a reverse osmosis membrane according to [4], wherein the aliphatic amide is one or more selected from asparagine, glutamine, formamide, acetamide, N,N-dimethylformamide, and N,N-dimethylacetamide, and wherein the aromatic amide is one or more selected from nicotinamide, benzamide, aminobenzamide, phthalamide, and hippuric acid.

[6] The agent for cleaning a reverse osmosis membrane according to any one of [1] to [5], the agent being used under an alkaline condition.

[7] The agent for cleaning a reverse osmosis membrane according to any one of [1] to [6], the agent further comprising a compound including an N-containing saturated heterocyclic ring.

[8] The agent for cleaning a reverse osmosis membrane according to any one of [1] to [7], the agent further comprising an anionic surfactant.

[9] The agent for cleaning a reverse osmosis membrane according to any one of [1] to [8], the agent further comprising a dispersant.

[10] A liquid for cleaning a reverse osmosis membrane, the liquid comprising the agent for cleaning a reverse osmosis membrane according to any one of [1] to [9].

[11] The liquid for cleaning a reverse osmosis membrane according to [10], the liquid being an alkaline liquid having a pH of 8 or more.

[12] A method for cleaning a reverse osmosis membrane, the method comprising using the agent for cleaning a reverse osmosis membrane according to any one of [1] to [9] or the liquid for cleaning a reverse osmosis membrane according to [10] or [11].

[13] The method for cleaning a reverse osmosis membrane according to [12], wherein the reverse osmosis membrane is an aromatic polyamide reverse osmosis membrane.

[14] The method for cleaning a reverse osmosis membrane according to [12] or [13], wherein the reverse osmosis membrane is a reverse osmosis membrane that has been used for desalination of seawater or treatment of wastewater.

Advantageous Effects of Invention

According to the present invention, it is possible to efficiently remove foulants that can not be sufficiently removed with cleaning agents known in the related art from an RO membrane particularly an aromatic polyamide RO membrane when the RO membrane has been used for water treatment and has become fouled resulting in degradation of performance such as permeation flux, pressure difference, and salt rejection rate.

DESCRIPTION OF EMBODIMENTS

Figure 1:
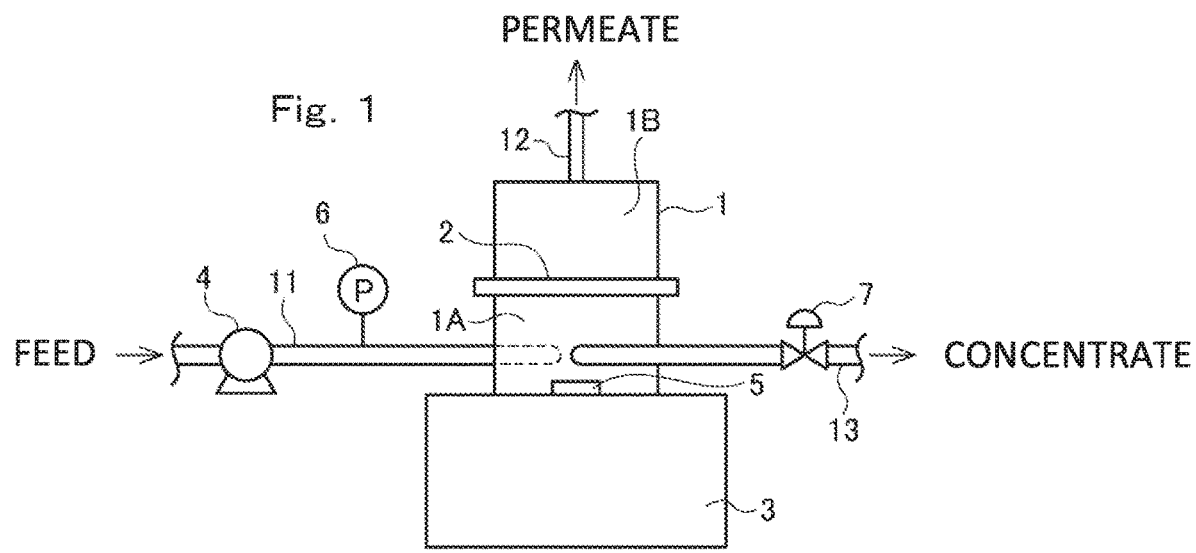
FIG. 1 is a schematic diagram illustrating a flat-membrane testing apparatus used in Examples.

An embodiment of the present invention is described below in detail.

[Mechanism of Action]

The mechanism of the action according to the present invention is not clear in detail but presumably as follows.

While the detachment and hydrolysis effects are achieved by performing cleaning under alkaline conditions, the aliphatic amide and/or the aromatic amide (hereinafter, may be referred to as "amide compound") penetrates foulants and causes the detachment of the foulants. When an anionic surfactant is used in combination with the amide compound, the anionic surfactant penetrates foulants and causes the detachment of the foulants. When a dispersant is used in combination with the amide compound, the dispersant causes dispersion of inorganic substances and chelation of the inorganic substances. When a compound including an N-containing saturated heterocyclic ring (hereinafter, may be referred to as "N-containing saturated heterocyclic compound") is used in combination with the amide compound, the N-containing saturated heterocyclic compound penetrates foulants and makes the foulants hydrophilic. In particular, using the amide compound in combination with an anionic surfactant increases the penetration and detachment effects. The above components synergistically increase the alkali cleaning effect.

While the mechanism of action by which the amide compound exhibits the penetration and detachment effects is not clear, it is considered that, since an amide bond site of the amide compound has a structure analogous to the structure of a polyamide bond included in an RO membrane and, in particular, the structure of an amide bond of an aromatic polyamide, the amide compound penetrates between the surface of the membrane and foulants and promotes the detachment of the foulants because the amide compound has an affinity for foulants as well as for the surface of the membrane.

[RO Membrane]

The RO membrane that is to be cleaned in the present invention may be either a polyamide RO membrane, such as an aromatic polyamide RO membrane, or a cellulose acetate RO membrane. The present invention is particularly effective for cleaning an aromatic polyamide RO membrane. The present invention is particularly effective on an RO membrane which has been used for desalination of seawater or treatment of wastewater and has become fouled with various foulants that can not be sufficiently cleaned with cleaning agents known in the related art.

[Agent for Cleaning RO Membrane]

The agent for cleaning an RO membrane according to the present invention includes the amide compound. The agent for cleaning an RO membrane according to the present invention is commonly prepared by dissolving the amide compound and optional components, such as an alkaline agent, other chemicals, and a solvent, in water.

The term "cleaning agent" used herein refers to an agent that is prepared for the distribution and storage of the products and contains the amide, the other chemicals, and the like at concentrations higher than those required when the chemicals are used for cleaning an RO membrane. The term "cleaning liquid" used herein refers to a liquid prepared by diluting the cleaning agent with water to the concentrations at which the chemicals are used for cleaning an RO membrane.

<Amide Compound>

The amide compound is preferably soluble in water in consideration of affinity for an RO membrane. The amide compound preferably has a molecular weight of 300 or less and particularly preferably has a relatively low molecular weight of 200 or less so as to penetrate between an RO membrane and foulants and exhibit good cleaning effects. An amide compound having an excessively high molecular weight is difficult to penetrate between an RO membrane and foulants and does not exhibit good cleaning effects.

The amide compound is preferably the compound represented by Formula (I) below in consideration of cleaning effects.

[Chem. 2]

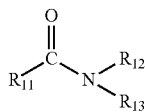

Formula (I)

In Formula (I), $R_{11}$ represents a hydrogen atom, an alkyl group having 1 to 3 carbon atoms, an N-containing heterocyclic group, or an aromatic group, where the alkyl group, the N-containing heterocyclic group, and the aromatic group may include a substituent; $R_{12}$ represents a hydrogen atom or an alkyl group having 1 to 3 carbon atoms, where the alkyl group may include a substituent; and $R_{13}$ represents a hydrogen atom or an alkyl group having 1 to 3 carbon atoms.

Examples of the substituent that may be included in the alkyl group represented by $R_{11}$ in Formula (I) include a carboxyl group (—COOH), an amino group (—NH$_2$), and a hydroxyl group (—OH). The N-containing heterocyclic group is preferably an N-containing unsaturated heterocyclic group. Specific examples thereof include a pyridyl group, an imidazolyl group, an indolyl group, a thiazolyl group, a triazinyl group, a pyrazinyl group, and a pyrimidinyl group. Examples of the aromatic group include aromatic hydrocarbon groups, such as a phenyl group, a naphthyl group, and an indenyl group. Examples of the substituent that may be included in the N-containing heterocyclic group and the aromatic group include a carboxyl group (—COOH), an amino group (—NH$_2$), an aminocarbonyl group (—CONH$_2$), a hydroxyl group (—OH), and an alkyl group (—C$_n$H$_{2n+1}$).

Examples of the substituent that may be included in the alkyl group represented by $R_{12}$ include a carboxyl group (—COOH), an amino group (—NH$_2$), and a hydroxyl group (—OH).

Specific examples of the amide compound include the following.

[Chem. 3]

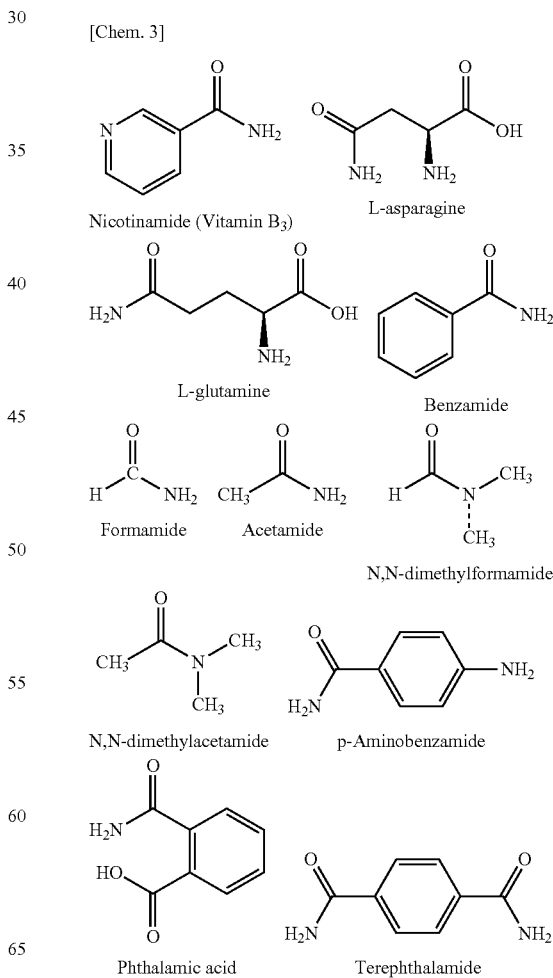

-continued

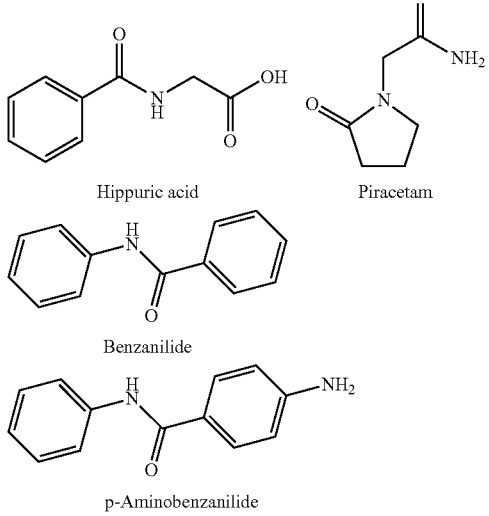

Among the above amide compounds, in particular, asparagine, glutamine, formamide, acetamide, N,N-dimethylformamide, and N,N-dimethylacetamide are preferable as an aliphatic amide, and nicotinamide, benzamide, aminobenzamide, phthalamide, and hippuric acid are preferable as an aromatic amide.

The above amide compounds may be used alone or in combination of two or more.

<Other Components>

The agent for cleaning an RO membrane according to the present invention may include, in addition to the amide compound, an alkaline agent, a detergent, and a solvent that are necessary for cleaning an RO membrane.

Examples of the alkaline agent included in the agent for cleaning an RO membrane according to the present invention include hydroxides of alkali metals, such as sodium hydroxide and potassium hydroxide.

Examples of the detergent include a surfactant and a dispersant.

Examples of the surfactant include anionic surfactants, such as an alkylbenzenesulfonate (e.g., sodium dodecylbenzenesulfonate) and an alkyl sulfate (e.g., sodium dodecyl sulfate); and nonionic surfactants, such as a polyalkylene glycol monoalkyl ether (e.g., diethylene glycol monomethyl ether).

Among the above surfactants, anionic surfactants are particularly preferable in terms of dispersion effects.

Examples of the dispersant include the following chelating agents: ethylenediaminetetraacetic acid (EDTA), glycol ether diamine tetraacetic acid (EGTA), polyphosphoric acid, phosphonobutanetricarboxylic acid (PBTC), phosphonic acid, polymaleic acid, citric acid, oxalic acid, gluconic acid, and the salts of the above acids.

The above dispersants may be used alone or in combination of two or more.

The agent for cleaning a reverse osmosis membrane according to the present invention may further include an N-containing saturated heterocyclic compound.

The N-containing saturated heterocyclic ring included in the N-containing saturated heterocyclic compound may be any saturated heterocyclic ring that contains a nitrogen atom constituting the ring. The N-containing saturated heterocyclic ring is preferably a five-membered ring or a six-membered ring and is more preferably a five-membered ring. Examples of the N-containing saturated heterocyclic ring include five-membered rings such as a pyrrolidine ring, a pyrrolidone ring, an imidazolidine ring, and an imidazolidinone ring; and six-membered rings such as a piperidine ring and a piperazine ring.

The N-containing saturated heterocyclic compound is particularly preferably selected from the pyrrolidine represented by Formula (1) below, a derivative of the pyrrolidine, the imidazolidine represented by Formula (2) below, and a derivative of the imidazolidine in consideration of the cleaning effects. Formula (1) represents a pyrrolidine ring and a pyrrolidone ring. Formula (2) represents an imidazolidine ring and an imidazolidinone ring.

[Chem.4]

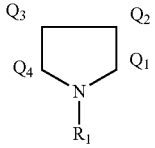

Formula (1)

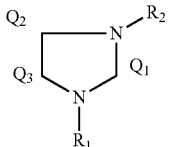

Formula (2)

In Formula (1), $R_1$ and $R_2$ each independently represent a hydrogen atom or a hydrocarbon group having 1 to 4 carbon atoms which may include a substituent; and $Q_1$ to $Q_4$ each independently represent two hydrogen atoms, an oxygen atom, a hydrogen atom and an optional substituent, or two optional substituents.

The term "substituent" used herein refers to a functional group or an atom that is other than a hydrogen atom and may refer to a halogen atom.

Examples of the hydrocarbon group represented by $R_1$ and $R_2$ in Formulae (1) and (2) include an alkyl group, an alkenyl group, and an alkynyl group. Examples of the alkyl group include a methyl group (—$CH_3$) and an ethyl group (—$CH_2CH_3$). Examples of the alkenyl group include a vinyl group (—CH=$CH_2$). Examples of the substituent that may be included in the hydrocarbon group include an aminocarbonyl group, a carboxyl group, an amino group, a hydroxyl group, and a halogen atom. For example, a methyl group is substituted with an aminocarbonyl group to form an aminocarbonylmethyl group (—$CH_2C(O)NH_2$).

Examples of the optional substituents of $Q_1$ to $Q_4$ include a carboxyl group (—COOH), an amino group (—$NH_2$), a hydroxyl group (—OH), and a halogen atom.

Specific examples of the N-containing saturated heterocyclic compound include the following compounds.

[Chem. 5]

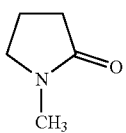 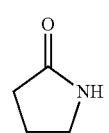 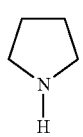

N-methyl-2-pyrrolidone   2-Pyrrolidone   Pyrrolidine

-continued

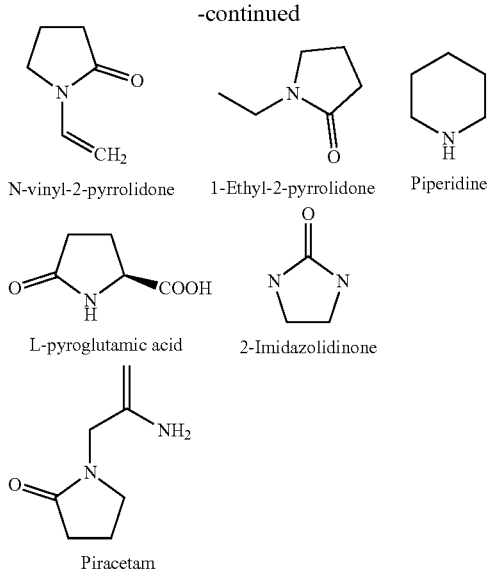

N-vinyl-2-pyrrolidone  1-Ethyl-2-pyrrolidone  Piperidine

L-pyroglutamic acid  2-Imidazolidinone

Piracetam

The above N-containing saturated heterocyclic compounds may be used alone or in a mixture of two or more.

Examples of the solvent include alcohols, such as ethanol; polyols, such as ethylene glycol, propylene glycol, and butanediol; amines, such as monoethanolamine, diethanolamine, and triethanolamine; ketones, such as acetone; and ethers, such as dimethyl ether, diethyl ether, and diethylene glycol monomethyl ether.

The agent for cleaning an RO membrane according to the present invention may be a one-part cleaning agent prepared by mixing the amide compound with the alkaline agent, the detergents, and the like. The cleaning agent may also be a two-part cleaning agent, that is, some of the above components may be separately provided in the form of a second part of the agent. Alternatively, the cleaning agent may be constituted by three or more parts.

The liquid for cleaning an RO membrane according to the present invention, which is prepared by diluting the agent for cleaning an RO membrane according to the present invention with water, may also be constituted by one part, two parts, or three or more parts. In the case where the cleaning liquid is constituted by two parts or three or more parts, for example, an RO membrane is cleaned with a cleaning liquid including the amide compound and subsequently with another cleaning liquid including other detergents.

The concentration of each chemical in the agent for cleaning an RO membrane according to the present invention is adjusted to be about 5 to 100 times by weight the concentration of the chemical in the liquid for cleaning an RO membrane according to the present invention, which is described below, so that the preferable concentration of the chemical in the liquid for cleaning an RO membrane is achieved when the cleaning agent is diluted with water, which is preferably pure water, about 5 to 100 times by weight.

The agent for cleaning an RO membrane according to the present invention may be prepared in the form of an aqueous solution. Alternatively, the entirety or a part of the cleaning agent may be prepared in the form of a powder or a solid.

[Cleaning Liquid]

The liquid for cleaning an RO membrane according to the present invention is an aqueous solution prepared by diluting the agent for cleaning an RO membrane according to the present invention with water. The liquid for cleaning an RO membrane according to the present invention may also be prepared by diluting the agent for cleaning an RO membrane according to the present invention with water and optionally adding the alkaline agent, the detergents, the other solvent, and the like to the diluted cleaning agent at the predetermined concentrations.

The liquid for cleaning an RO membrane according to the present invention is not necessarily prepared from the agent for cleaning an RO membrane according to the present invention and may be directly prepared such that the predetermined chemical concentrations are achieved.

The preferable concentration of the amide compound in the liquid for cleaning an RO membrane according to the present invention varies with the type of the amide compound used, the pH of the cleaning liquid, the presence of the other detergents used in combination with the amide, the types and concentrations of the other detergents, and the like. The concentration of the amide in the cleaning liquid is preferably about 0.1% to 10% by weight and is particularly preferably about 0.5% to 5% by weight. If the concentration of the amide compound is lower than the above lower limit, it is not possible to sufficiently clean an RO membrane by using the amide compound. On the other hand, setting the concentration of the amide compound to be higher than the upper limit may reduce the cleaning effects and unnecessarily increases the nitrogen content in the waste cleaning liquid.

The liquid for cleaning an RO membrane according to the present invention is preferably adjusted to be alkaline or acidic in consideration of the cleaning effects. In the case where the cleaning liquid is adjusted to be alkaline, the pH of the cleaning liquid is preferably 8 or more and is particularly preferably 10 to 14.

If the pH of the cleaning liquid is less than 8, the permeability of the membrane may fail to be sufficiently recovered by cleaning. The higher the pH of the cleaning liquid, the larger the cleaning effect. However, setting the pH of the cleaning liquid to be excessively high reduces ease of handling of the cleaning liquid and increases the risk of the degradation of the RO membrane. The pH of the cleaning liquid is preferably 14 or less and is more preferably 11 or more and 13 or less.

In the case where the liquid for cleaning an RO membrane is adjusted to be acidic, the pH of the cleaning liquid is preferably 4 or less and is particularly preferably 1 to 3. When the pH of the cleaning liquid falls with in the above range, sufficient cleaning effects may be achieved.

The pH of the liquid for cleaning an RO membrane according to the present invention is adjusted to be the above preferable pH value by the addition of the alkaline agent or an acidic chemical.

In the case where the liquid for cleaning an RO membrane according to the present invention is used for cleaning a cellulose acetate membrane, the pH of the cleaning liquid is preferably set to be less than 8, and a surfactant may be added to the cleaning liquid.

In the case where the liquid for cleaning an RO membrane according to the present invention includes the surfactant, the concentration of the surfactant in the liquid for cleaning an RO membrane according to the present invention is preferably 100 to 10000 mg/L and is particularly preferably 300 to 5000 mg/L. If the concentration of the surfactant in the liquid for cleaning an RO membrane according to the present invention is excessively low, a sufficient dispersion effect of the surfactant may fail to be achieved. In addition, the cleaning effect may fail to be sufficiently enhanced by using the surfactant. If the concentration of the surfactant in the liquid for cleaning an RO membrane according to the present invention is excessively high, on the contrary, the degree of association of surfactant molecules is increased. This may reduce the cleaning effect.

In the case where the liquid for cleaning an RO membrane according to the present invention includes the dispersant, the concentration of the dispersant in the liquid for cleaning an RO membrane according to the present invention is preferably 100 to 20000 mg/L and is particularly preferably 1000 to 10000 mg/L. If the concentration of the dispersant in the liquid for cleaning an RO membrane according to the present invention is excessively low, the dispersion and cleaning effects may fail to be sufficiently achieved by using the dispersant. Setting the concentration of the dispersant in the liquid for cleaning an RO membrane according to the present invention to be excessively high does not increase the cleaning effects in accordance with the concentration of the dispersant.

In the case where the liquid for cleaning an RO membrane according to the present invention includes the N-containing saturated heterocyclic compound, the concentration of the N-containing saturated heterocyclic compound in the liquid for cleaning an RO membrane is preferably about 0.1% to 10% by weight and is particularly preferably about 0.5% to 5% by weight. If the concentration of the N-containing saturated heterocyclic compound is lower than the above lower limit, the RO-membrane cleaning effects may fail to be sufficiently achieved by using the N-containing saturated heterocyclic compound. Setting the concentration of the N-containing saturated heterocyclic compound to be higher than the above upper limit may reduce the cleaning effects and unnecessarily increases the nitrogen content in the waste cleaning liquid.

<Method for Producing Agent and Liquid for Cleaning RO Membrane>

The agent for cleaning an RO membrane according to the present invention is prepared by mixing the amide compound, the optional alkaline agent, the optional acidic chemical, the optional detergents, the other solvents, and the like with water. The entirety or a part of the agent for cleaning an RO membrane according to the present invention may be prepared in the form of a powder or a solid.

The liquid for cleaning an RO membrane according to the present invention is produced by diluting the agent for cleaning an RO membrane according to the present invention, which is produced by the above-described method, with water, which is preferably pure water, and optionally adding the alkaline agent, the detergents, the other solvents, and the like to the diluted cleaning agent. The liquid for cleaning an RO membrane according to the present invention is not necessarily produced from the agent for cleaning an RO membrane according to the present invention and may be directly produced by the above-described method.

<Cleaning Method>

For cleaning an RO membrane with the liquid for cleaning an RO membrane according to the present invention, any method in which the cleaning liquid is brought into contact with the RO membrane may be employed. One of the common methods is immersion cleaning, in which the cleaning liquid is introduced into a raw-water-side portion of an RO-membrane module and the RO-membrane module is subsequently left to stand. Optionally, circulation cleaning, in which the cleaning liquid is used in a circulatory manner, may be performed prior or subsequent to the immersion cleaning.

In the case where the agent and the liquid for cleaning an RO membrane according to the present invention are constituted by two parts or three or more parts, the parts may be mixed together before used for cleaning. Alternatively, the parts may be each separately used and cleaning may be performed in multiple stages with the respective parts. For example, after cleaning has been performed with a cleaning liquid including the amide compound, another cleaning is performed with a cleaning liquid including the other chemicals.

The immersion cleaning described above or a combination of the immersion cleaning and the circulation cleaning described above is commonly used even in the case where another cleaning, such as cleaning using an aqueous alkaline solution or an aqueous acidic solution, is performed prior or subsequent to the cleaning using the liquid for cleaning an RO membrane according to the present invention.

An example of cleaning using a cleaning liquid other than the liquid for cleaning an RO membrane according to the present invention is cleaning using an aqueous alkaline solution that does not contain the amide compound subsequent to the cleaning using the liquid for cleaning an RO membrane according to the present invention. Examples of an alkaline agent included in the aqueous alkaline solution are the same as the above-described examples of the alkaline agent included in the liquid for cleaning an RO membrane according to the present invention. The pH of the aqueous alkaline solution is preferably 10 or more and is particularly preferably 11 to 13 in consideration of the cleaning effects and ease of handling.

Another example of the cleaning using a cleaning liquid other than the liquid for cleaning an RO membrane according to the present invention is cleaning using an aqueous acidic solution, which is effective for the removal of scale and metal colloid particles. For performing cleaning using an aqueous acidic solution, an aqueous solution that includes one or more acids selected from hydrochloric acid, nitric acid, citric acid, oxalic acid, and the like may be used. The pH of the aqueous acidic solution is preferably 4 or less and is particularly preferably 1 to 3 in consideration of the cleaning effects and ease of handling.

The amount of time during which immersion cleaning using the liquid for cleaning an RO membrane according to the present invention or the other cleaning liquid is performed is not limited and may be set such that the properties of the membrane are recovered at desired recovery rate. The immersion cleaning is commonly performed for about 2 to 24 hours. In the case where the circulation cleaning is performed prior or subsequent to the immersion cleaning, the amount of time during which the circulation cleaning is performed is not limited and may be set such that the properties of the membrane are recovered at desired recovery rate. The circulation cleaning is commonly performed for about 0.5 to 3 hours.

In the case where the cleaning using the liquid for cleaning an RO membrane according to the present invention and the cleaning using the aqueous alkaline solution and/or the aqueous acidic solution are performed in a combined manner, the order in which the two cleanings are conducted is not limited. Performing cleaning using the aqueous acidic solution prior to the cleaning using the liquid for cleaning an RO membrane according to the present invention enables effective removal of scale.

Subsequent to the cleaning using the above cleaning liquids, commonly, high-purity water, such as pure water, is passed through the membrane in order to perform finish-cleaning. Subsequently, the operation of the RO membrane system is restarted.

EXAMPLES

The present invention is described below further specifically with reference to Examples and Comparative examples.

Figure 2:
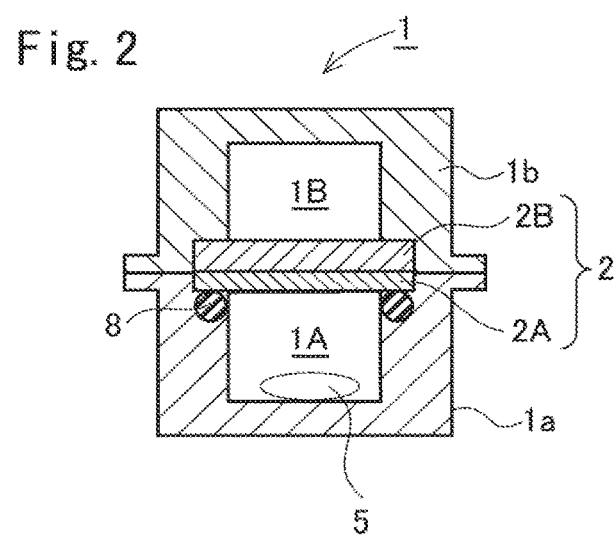
FIG. 2 is a cross-sectional view of a closed container included in the flat-membrane testing apparatus illustrated in FIG. 1, illustrating the structure of the closed container.

In Examples and Comparative examples below, the RO-membrane cleaning effects were determined using the flat-membrane testing apparatus illustrated in FIGS. 1 and 2.

In the flat-membrane testing apparatus, RO-membrane feed is fed to a raw-water chamber 1A included in a closed container 1 with a high-pressure pump 4 through a pipe 11. The raw-water chamber 1A is located below a flat-membrane cell 2 including an RO membrane. As illustrated in FIG. 2, the closed container 1 is constituted by a lower casing 1a and an upper casing 1b, which are located on the raw-water-chamber-1A side and the permeate-chamber-1B side, respectively. The flat-membrane cell 2 is fixed in position by being interposed between the lower casing 1a and the upper casing 1b with an O-ring 8. The flat-membrane cell 2 is constituted by an RO membrane 2A and a porous supporting plate 2B that supports the permeate-side surface of the RO membrane 2A. The inside of the raw-water chamber 1A, which is located below the flat-membrane cell 2, is stirred by a stirrer 3 rotating a stirring bar 5. The permeate of the RO membrane is passed into a permeate chamber 1B located above the flat-membrane cell 2 and subsequently drawn through a pipe 12. The concentrate is drawn through a pipe 13. The pressure inside the closed container 1 is adjusted with a pressure gage 6 disposed in the feed pipe 11 and a pressure control valve 7 disposed in the concentrate-drawing pipe 13.

Cleaning tests were all conducted at 25° C.

The permeation flux and salt rejection rate of the RO membrane were calculated using the following formulae.

Permeation Flux [$m^3/(m^2 \cdot day)$]=Flow Rate of Permeate [$m^3$/day]/Area of Membrane [$m^2$]×Temperature Conversion Coefficient [–]

Salt Rejection Rate [%]=(1–Electric Conductivity of Permeate [mS/m]/Electric Conductivity of Concentrate [mS/m])×100

Example I-1 and Comparative Examples I-1 to I-4

The cleaning tests described below were conducted using the following cleaning liquids.
<Cleaning Liquids>

Example 1

Aqueous sodium hydroxide solution with a pH of 12 containing 2-weight % nicotinamide, 1500-mg/L sodium dodecyl sulfate, and 5000-mg/L sodium gluconate

Comparative Example I-1

Aqueous sodium hydroxide solution with a pH of 12

Comparative Example I-2

Aqueous sodium hydroxide solution with a pH of 12 containing 2-weight % propylene glycol, 1500-mg/L sodium dodecyl sulfate, and 5000-mg/L sodium gluconate

Comparative Example I-3

Aqueous sodium hydroxide solution with a pH of 12 containing 2-weight % ethanol, 1500-mg/L sodium dodecyl sulfate, and 5000-mg/L sodium gluconate

Comparative Example I-4

Aqueous sodium hydroxide solution with a pH of 12 containing 1-weight % diethylene glycol monomethyl ether, 1500-mg/L sodium dodecyl sulfate, and 5000-mg/L sodium gluconate
<Test Method>

An aromatic polyamide RO membrane "TM-820A" (fresh membrane, permeation flux: 0.6 [$m^3/(m^2 \cdot day)$]) produced by Toray Industries, Inc. was attached to an RO apparatus included in a seawater desalination RO system. The RO system was subsequently operated for three years. After the operation of the RO system had been terminated, the membrane was removed from the RO apparatus and dismantled to prepare a flat membrane sample of a fouled membrane. The flat membrane sample was cut into a circular shape and placed on the flat-membrane testing apparatus illustrated in FIGS. 1 and 2 to which a membrane having the same size as the flat membrane sample can be attached. Subsequently, a test was conducted in the following manner.

(1) Pure water was passed, at 1.55 MPa, through the fouled membrane that had not yet been cleaned in order to measure the pure-water permeation flux of the fouled membrane before cleaning. Subsequently, a 2000-mg/L aqueous sodium chloride solution was passed through the fouled membrane under the same conditions as above in order to measure the salt rejection rate of the membrane.

(2) A specific one of the above cleaning liquids was fed to the membrane in order to clean the membrane. For each case, the cleaning was performed in the order of 2-hour circulation cleaning, 15-hour immersion cleaning, and 2-hour circulation cleaning. The operating pressure during the circulation cleaning was set to 0.2 MPa.

(3) The pure-water permeation flux and salt rejection rate of the cleaned membrane were measured as in (1) above.

(4) The recovery rate was calculated using the following formula.

Recovery Rate [–]=(Permeation Flux of Cleaned Membrane)/(Permeation Flux of Fresh Membrane)

Table 1 shows the results. In Table 1, "DEGME" refers to diethylene glycol monomethyl ether, "SDS" refers to sodium dodecyl sulfate, and "GANa" refers to sodium gluconate.

TABLE 1

| | Cleaning liquid | | Permeation flux [$m^3/(m^2 \cdot day)$] | | Recovery rate [–] |
|---|---|---|---|---|---|
| | pH | Cleaning liquid component | Before cleaning | After cleaning | |
| Example I-1 | 12 | Nicotinamide + NaOH + SDS + GANa | 0.308 | 0.488 | 0.81 |
| Comparative example I-1 | 12 | NaOH | 0.327 | 0.387 | 0.65 |
| Comparative exampleI-2 | 12 | Propylene glycol + NaOH + SDS + GANa | 0.336 | 0.447 | 0.75 |

TABLE 1-continued

|  | Cleaning liquid pH | Cleaning liquid component | Permeation flux [m³/(m²·day)] Before cleaning | After cleaning | Recovery rate [—] |
|---|---|---|---|---|---|
| Comparative exampleI-3 | 12 | Ethanol + NaOH + SDS + GANa | 0.347 | 0.441 | 0.74 |
| Comparative exampleI-4 | 12 | DEGME + NaOH + SDS + GANa | 0.343 | 0.414 | 0.69 |

The results shown in Table 1 confirm that the cleaning liquid including nicotinamide which was prepared in Example I-1 had higher cleaning effects than the other cleaning liquids.

In all of Example I-1 and Comparative examples I-1 to I-4, the salt rejection rate of the cleaned RO membrane was substantially equal to that of the RO membrane before cleaning, that is, about 98% to 99%.

Examples II-1 to II-5, Examples III-1 to III-8, Comparative Examples II-1 to II-7, and Comparative Examples III-1 to III-7

The cleaning tests described below were conducted using the following cleaning liquids.

<Cleaning Liquids>

Example II-1

Aqueous sodium hydroxide solution with a pH of 12 containing 2-weight % nicotinamide

Example II-2

Aqueous sodium hydroxide solution with a pH of 12 containing 4-weight % nicotinamide

Example II-3

Aqueous sodium hydroxide solution with a pH of 12 containing 2-weight % nicotinamide and 2-weight % N-methyl-2-pyrrolidone

Example II-4

Aqueous sodium hydroxide solution with a pH of 12 containing 1-weight % benzamide

Example II-5

Aqueous solution with a pH of 2.6 containing 2-weight % p-aminobenzamide and 2-weight % citric acid

Comparative Example II-1

Aqueous sodium hydroxide solution with a pH of 12

Comparative Example II-2

Aqueous sodium hydroxide solution with a pH of 12 containing 2-weight % nicotinic acid

Comparative Example II-3

Aqueous sodium hydroxide solution with a pH of 12 containing 2-weight % benzoic acid

Comparative Example II-4

Aqueous sodium hydroxide solution with a pH of 12 containing 2-weight % ethanol

Comparative Example II-5

Aqueous sodium hydroxide solution with a pH of 12 containing 2-weight % acetone

Comparative Example II-6

Aqueous sodium hydroxide solution with a pH of 12 containing 2-weight % propylene glycol

Comparative Example II-7

Aqueous solution with a pH of 2.6 containing citric acid (2 weight %)

Example III-1

Aqueous sodium hydroxide solution with a pH of 12 containing 2-weight % nicotinamide and 1500-mg/L sodium dodecylbenzenesulfonate

Example III-2

Aqueous sodium hydroxide solution with a pH of 12 containing 2-weight % asparagine and 1500-mg/L sodium dodecylbenzenesulfonate

Example III-3

Aqueous sodium hydroxide solution with a pH of 12 containing 2-weight % formamide and 1500-mg/L sodium dodecylbenzenesulfonate

Example III-4

Aqueous sodium hydroxide solution with a pH of 12 containing 2-weight % N,N-dimethylacetamide and 1500-mg/L sodium dodecylbenzenesulfonate

Example III-5

Aqueous sodium hydroxide solution with a pH of 12 containing 2-weight % N,N-dimethylacetamide, 2-weight % piperidine, and 1500-mg/L sodium dodecylbenzenesulfonate

Example III-6

Aqueous sodium hydroxide solution with a pH of 12 containing 2-weight % piracetam and 1500-mg/L sodium dodecylbenzenesulfonate

Example III-7

Aqueous sodium hydroxide solution with a pH of 12 containing 0.5-weight % p-aminobenzamide and 1500-mg/L sodium dodecylbenzenesulfonate

Example III-8

Aqueous sodium hydroxide solution with a pH of 12 containing 2-weight % phthalamic acid and 1500-mg/L sodium dodecylbenzenesulfonate

Comparative Example III-1

Aqueous sodium hydroxide solution with a pH of 12 containing 1500-mg/L sodium dodecylbenzenesulfonate

Comparative Example III-2

Aqueous sodium hydroxide solution with a pH of 12 containing 2-weight % ethanol and 1500-mg/L sodium dodecylbenzenesulfonate

Comparative Example III-3

Aqueous sodium hydroxide solution with a pH of 12 containing 2-weight % isopropanol and 1500-mg/L sodium dodecylbenzenesulfonate

Comparative Example III-4

Aqueous sodium hydroxide solution with a pH of 12 containing 2-weight % propylene glycol and 1500-mg/L sodium dodecylbenzenesulfonate

Comparative Example III-5

Aqueous sodium hydroxide solution with a pH of 12 containing 2-weight % ethylene glycol and 1500-mg/L sodium dodecylbenzenesulfonate

Comparative Example III-6

Aqueous sodium hydroxide solution with a pH of 12 containing 2-weight % diethylene glycol monomethyl ether and 1500-mg/L sodium dodecylbenzenesulfonate

Comparative Example III-7

Aqueous sodium hydroxide solution with a pH of 12 containing 2-weight % monoethanolamine and 1500-mg/L sodium dodecylbenzenesulfonate <Test Method>

An aromatic polyamide RO membrane "ES-20" (fresh membrane) produced by Nitto Denko Corporation was cut into a circular shape to prepare a flat membrane sample. The sample was placed on the flat-membrane testing apparatus illustrated in FIGS. 1 and 2 to which a membrane having the same size as the flat membrane sample can be attached. Subsequently, a test was conducted in the following manner.

(1) Pure water was passed through the fresh membrane at 0.75 MPa for 24 hours in order to measure the pure-water permeation flux of the fresh membrane. Subsequently, a 500-mg/L aqueous sodium chloride solution was passed through the membrane under the same conditions as above in order to measure the salt rejection rate of the membrane.

(2) Subsequently, an aqueous solution containing a nonionic surfactant (200-mg/L aqueous solution of Semi-Clean KG (Yokohama Oils & Fats Industry Co., Ltd.)) was passed through the membrane at 0.75 MPa for 3 days in order to prepare a fouled membrane. The pure-water permeation flux and salt rejection rate of the fouled membrane were measured as in (1) above.

(3) A specific one of the above cleaning liquids was fed to the membrane in order to clean the membrane. For each case, the cleaning was performed in the order of 2-hour circulation cleaning, 15-hour immersion cleaning, and 2-hour circulation cleaning. The operating pressure during the circulation cleaning was set to 0.2 MPa.

(4) Subsequently, the pure-water permeation flux and salt rejection rate of the membrane were measured as in (1) above.

(5) The recovery rate was calculated using the following formula.

Recovery Rate [-]=(Permeation Flux of Cleaned Membrane)/(Permeation Flux of Fresh Membrane)

Tables 2 and 3 show the results. In Tables 2 and 3, "DEGME" refers to diethylene glycol monomethyl ether, and "SDBS" refers to sodium dodecylbenzenesulfonate.

TABLE 2

| | | | Permeation flux [m³/(m²·day)] | | | Recovery rate [-] |
|---|---|---|---|---|---|---|
| | pH | Cleaning liquid component | Fresh membrane | After fouling | After cleaning | |
| Example II-1 | 12 | 2% Nicotinamide + NaOH | 1.42 | 0.68 | 1.30 | 0.92 |
| Example II-2 | 12 | 4% Nicotinamide + NaOH | 1.39 | 0.60 | 1.40 | 1.01 |
| Example II-3 | 12 | 2% Nicotinamide + 2% N-methyl-2-pyrrolidone + NaOH | 1.30 | 0.61 | 1.26 | 0.97 |
| Example II-4 | 12 | 1% Benzamide + NaOH | 1.39 | 0.67 | 1.20 | 0.86 |
| Example II-5 | 2.6 | 2% p-Aminobenzamide + Citric acid | 1.50 | 0.73 | 0.90 | 0.60 |
| Comparative example II-1 | 12 | NaOH | 1.32 | 0.67 | 0.97 | 0.73 |
| Comparative example II-2 | 12 | 2% Nicotinic acid + NaOH | 1.32 | 0.75 | 1.04 | 0.79 |
| Comparative example II-3 | 12 | 2% Benzoic acid + NaOH | 1.33 | 0.56 | 0.98 | 0.74 |
| Comparative example II-4 | 12 | 2% Ethanol + NaOH | 1.49 | 0.71 | 1.14 | 0.77 |
| Comparative example II-5 | 12 | 2% Acetone + NaOH | 1.60 | 0.71 | 1.20 | 0.75 |
| Comparative example II-6 | 12 | 2% Propylene glycol + NaOH | 1.56 | 0.72 | 1.21 | 0.78 |
| Comparative example II-7 | 2.6 | Citric acid | 1.53 | 0.69 | 0.74 | 0.48 |

TABLE 3

| | pH | Cleaning liquid component | Permeation flux [m³/(m²·day)] Fresh membrane | After fouling | After cleaning | Recovery rate [-] |
|---|---|---|---|---|---|---|
| Example III-1 | 12 | 2% Nicotinamide + SDBS + NaOH | 1.35 | 0.66 | 1.29 | 0.96 |
| Example III-2 | 12 | 2% Asparagine + SDBS + NaOH | 1.36 | 0.66 | 1.23 | 0.90 |
| Example III-3 | 12 | 2% Formamide + SDBS + NaOH | 1.51 | 0.71 | 1.31 | 0.87 |
| Example III-4 | 12 | 2% N,N-dimethylacetamide + SDBS + NaOH | 1.52 | 0.75 | 1.33 | 0.88 |
| Example III-5 | 12 | 2% N,N-dimethylacetamide" + 2% Piperidine + SEBS + NaOH | 1.51 | 0.69 | 1.44 | 0.95 |
| Example III-6 | 12 | 2% Piracetam + SDBS + NaOH | 1.49 | 0.69 | 1.36 | 0.91 |
| Example III-7 | 12 | 0.5% p-Aminobenzamide + SDBS + NaOH | 1.43 | 0.71 | 1.23 | 0.86 |
| Example III-8 | 12 | 2% Phthalamide + SDBS + NaOH | 1.45 | 0.71 | 1.20 | 0.83 |
| Comparative example III-1 | 12 | SDBS + NaOH | 1.25 | 0.60 | 0.99 | 0.79 |
| Comparative example III-2 | 12 | 2% Ethanol + SDBS + NaOH | 1.58 | 0.71 | 1.25 | 0.79 |
| Comparative example III-3 | 12 | 2% Isopropanol + SDBS + NaOH | 1.68 | 0.75 | 1.25 | 0.74 |
| Comparative example III-4 | 12 | 2% Propylene glycol + SDBS + NaOH | 1.26 | 0.58 | 1.03 | 0.82 |
| Comparative example III-5 | 12 | 2% Ethylene glycol + SDBS + NaOH | 1.30 | 0.54 | 1.07 | 0.82 |
| Comparative example III-6 | 12 | 2% DEGME + SDBS + NaOH | 1.26 | 0.60 | 1.02 | 0.81 |
| Comparative example III-7 | 12 | 2% Monoethanolamine + SDBS + NaOH | 1.30 | 0.57 | 1.01 | 0.78 |

As is clear from the results shown in Tables 2 and 3, high cleaning effects were achieved when the amide compound was used. Although an anionic surfactant was not used in combination with the amide in Examples II-1 to II-5, the cleaning effects achieved in Examples II-1 to II-5 were higher than those achieved in Comparative example II-2 where an anionic surfactant was used.

A comparison between the results obtained in Example II-5 and the results obtained in Comparative example II-7 shows that the cleaning effects were increased even when the amide was used in combination with an acidic cleaning agent.

The results obtained in Examples III-1 to III-8 show that using an anionic surfactant in combination with the amide further enhanced the cleaning effects.

When the N-containing saturated heterocyclic compound was used in combination with the amide compound as in Example II-3 and Example III-5, the penetration and detachment effects of the amide and the penetration and hydrophilicity-imparting effects of the N-containing saturated heterocyclic compound produced good cleaning effects.

In particular, the cleaning liquids including nicotinamide had high cleaning effects.

The above results confirm that a cleaning liquid including an amide compound having an amide structure has higher cleaning effects than cleaning liquids including components other than the amide (e.g., propylene glycol, diethylene glycol, and monoethanolamine).

In all of Examples II-1 to II-5, Examples III-1 to III-8, Comparative examples II-1 to II-7, and Comparative examples III-1 to III-7, the salt rejection rates of the fresh RO membrane, the fouled RO membrane, and the cleaned RO membrane were substantially equal to one another and about 97% to 99%. This confirms that a reduction in salt rejection rate caused by the cleaning according to the present invention was negligible.

Although the present invention has been described in detail with reference to particular embodiments, it is apparent to a person skilled in the art that various modifications can be made therein without departing from the spirit and scope of the present invention.

The present application is based on Japanese Patent Application No. 2015-147779 filed on Jul. 27, 2015, which is incorporated herein by reference in its entirety.

REFERENCE SIGNS LIST

1 CONTAINER
2 FLAT-MEMBRANE CELL
2A RO MEMBRANE
2B POROUS SUPPORTING PLATE
3 STIRRER
4 HIGH-PRESSURE PUMP
5 STIR BAR
6 PRESSURE GAGE
7 PRESSURE CONTROL VALVE
8 O-RING

The invention claimed is:

1. A method for cleaning a reverse osmosis membrane, the method comprising contacting a liquid cleaning agent for cleaning a reverse osmosis membrane to the reverse osmosis membrane to thereby recover permeation flux of a fouled reverse osmosis membrane, the agent comprising an aliphatic amide and/or an aromatic amide having a molecular weight of 300 or less, and represented by Formula (I) below,

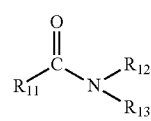

Formula (I)

wherein, in Formula (I), $R_{11}$ represents a hydrogen atom, an alkyl group having 1 to 3 carbon atoms, an N-containing heterocyclic group, or an aromatic group, where the alkyl group, the N-containing heterocyclic group, and the aromatic group may include a substituent; $R_{12}$ represents a hydrogen atom or an alkyl group having 1 to 3 carbon atoms, where the alkyl group may include a substituent; and $R_{13}$ represents a hydrogen atom or an alkyl group having 1 to 3 carbon atoms, wherein the concentration of the aliphatic amide and/or the aromatic amide present in the cleaning agent is 0.5% by weight to 5% by weight, based on the total weight of the cleaning agent, wherein the aliphatic amide and/or the aromatic amide is soluble in water, and wherein the aliphatic amide is one or more selected from the group consisting of glutamine, formamide, acetamide, N,N-dimethylformamide, and N,N-dimethylacetamide, and the aromatic amide is one or more selected from the group consisting of nicotinamide, benzamide, aminobenzamide, phthalamic acid, terephtalamide, benzanilide, p-aminobenzanilide, piracetam and hippuric acid.

2. The method for cleaning a reverse osmosis membrane according to claim 1, wherein the reverse osmosis membrane is an aromatic polyamide reverse osmosis membrane.

3. The method for cleaning a reverse osmosis membrane according to claim 1, wherein the reverse osmosis membrane is a reverse osmosis membrane that has been used for desalination of seawater or treatment of wastewater.

4. The method for cleaning a reverse osmosis membrane according to claim 1, wherein the agent is used under an alkaline condition.

5. The method for cleaning a reverse osmosis membrane according to claim 1, wherein the liquid cleaning agent has a pH of 8 or more.

6. The method for cleaning a reverse osmosis membrane according to claim 5, wherein the liquid cleaning agent further comprises an anionic surfactant.

7. The method for cleaning a reverse osmosis membrane according to claim 1, wherein the cleaning agent further comprises one or more chelating agents, as a dispersant, selected from the group consisting of ethylenediaminetetraacetic acid, glycol ether diamine tetraacetic acid, polyphosphoric acid, phosphonobutanetricarboxylic acid, phosphonic acid, polymaleic acid, citric acid, oxalic acid, gluconic acid, and salts of the above acids.

8. The method for cleaning a reverse osmosis membrane according to claim 7, wherein the cleaning agent further comprises an N-containing saturated heterocyclic compound having an N-containing saturated heterocyclic ring, the N-containing saturated heterocyclic ring being a five-membered ring or a six-membered ring.

9. The method for cleaning a reverse osmosis membrane according to claim 1, wherein the aliphatic amide is nicotinamide.

10. The method for cleaning a reverse osmosis membrane according to claim 1, wherein the aliphatic amide and/or the aromatic amide have a molecular weight of 200 or less.

11. A method for cleaning a reverse osmosis membrane, comprising:

contacting a liquid cleaning agent for cleaning a reverse osmosis membrane to the reverse osmosis membrane to thereby recover permeation flux of a fouled reverse osmosis membrane, the agent comprising an aliphatic amide and/or an aromatic amide having a molecular weight of 300 or less, and represented by Formula (I) below,

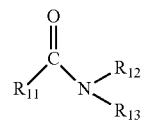

Formula (I)

wherein, in Formula (I), $R_{11}$ represents a hydrogen atom, an alkyl group having 1 to 3 carbon atoms, an N-containing heterocyclic group, or an aromatic group, where the alkyl group, the N-containing heterocyclic group, and the aromatic group may include a substituent; $R_{12}$ represents a hydrogen atom or an alkyl group having 1 to 3 carbon atoms, wherein the alkyl group may include a substituent; and $R_{13}$ represents a hydrogen atom or an alkyl group having 1 to 3 carbon atoms, wherein the concentration of the aliphatic amide and/or aromatic amide present in the cleaning agent is 0.5% by weight to 5% by weight, based on the total weight of the cleaning agent, wherein the agent further comprises one or more of a chelating agent, as a dispersant, selected from the group consisting of ethylenediaminetetraacetic acid, glycol ether diamine tetraacetic acid, polyphosphoric acid, phosphonobutanetricarboxylic acid, phosphonic acid, polymaleic acid, citric acid, oxalic acid, gluconic acid, and salts of the above acids, an N-containing saturated heterocyclic compound having an N-containing saturated heterocyclic ring, the N-containing saturated heterocyclic ring being a five-membered ring or a six-membered ring, and an anionic surfactant penetrating foulants and causing the detachment of the foulants.

12. The method for cleaning a reverse osmosis membrane according to claim 11, wherein the aliphatic amide and/or the aromatic amide is soluble in water.

13. The method for cleaning a reverse osmosis membrane according to claim 12, wherein the aliphatic amide is one or more selected from the group consisting of glutamine, formamide, acetamide, N,N-dimethylformamide, and N,N-dimethylacetamide, and wherein the aromatic amide is one or more selected from the group consisting of nicotinamide, benzamide, aminobenzamide, phthalamic acid, terephtalamide, benzanilide, p-aminobenzanilide, piracetam and hippuric acid.

14. The method for cleaning a reverse osmosis membrane according to claim 11, wherein the aliphatic amide and/or the aromatic amide have a molecular weight of 200 or less.

* * * * *